PHONOGRAPH PICKUP HAVING A CENTILEVER INDEXING ARM

Filed April 2, 1948

Inventors:
Eric O. Peterson,
Carroll R. Miner,
by Merton D. Moore
Their Attorney.

Patented May 22, 1951

2,554,208

UNITED STATES PATENT OFFICE 2,554,208

PHONOGRAPH PICKUP HAVING A CANTILEVER INDEXING ARM

Eric O. Peterson, Syracuse, and Carroll R. Miner, Liverpool, N. Y., assignors to General Electric Company, a corporation of New York Application April 2, 1948, Serial No. 18,648

23 Claims. (Cl. 179—100.41)

Figure 1:
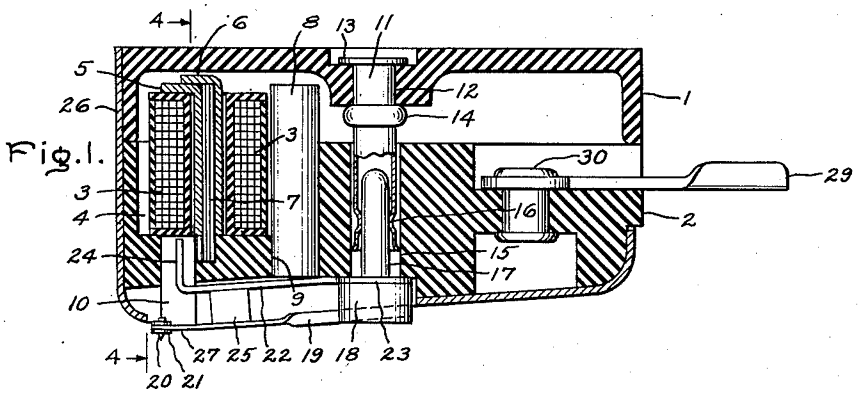

Our invention relates to vibration translating devices and, in particular, to phonograph pickups and has for its primary object to effect certain improvements in the construction of phonograph pickups and the stylus used therewith.

In the copending application of William S. Bachman, Serial No. 638,378, filed December 29, 1945 (now United States Patent No. 2,511,663 granted June 13, 1950) and assigned to the assignee of the present invention, there is disclosed a phonograph pickup of the reluctance type in which a stylus is mounted on the end of a cantilever arm. A pair of pole pieces included in a magnetic field are arranged on opposite sides of the cantilever arm so that, as the stylus is moved laterally in engagement with the phonograph record to be reproduced, the flux in an associated magnetic path is varied in accordance with the variations of the stylus. A pair of coils associated with the magnetic structure are utilized to produce electrical currents, the frequency components of which vary in accordance with the variations of the vibrations of the stylus caused by the record. It is an object of the present invention to effect certain improvements in the construction of a phonograph pickup of this type.

It is customary in such phonograph reproducers to employ a stylus of the semi-permanent type, that is, one comprising a precious jewel having a tip which is rounded so that it rides upon the side wall of the grooves of a record. It has been found, however, that, due to the abrasive action of the material of which the record is formed, after a limited number of records have been played the sides of the tip of the stylus are flattened so that less faithful reproduction of a record is obtained thereafter. Due to the fact that, in an attempt to minimize wear upon the stylus and the record, the mass of the pickup is maintained as small as possible, heretofore it has been difficult to obtain a pickup construction which permits easy replacement of a stylus of the semi-permanent type. Accordingly, it is a further object of our invention to provide a lightweight pickup using a semi-permanent stylus point in which the stylus may be easily replaced by the user.

It is another object of our invention to provide a phonograph pickup which employs a semi-permanent stylus permanently mounted upon the end of a cantilever arm and in which the stylus assembly may be easily and quickly replaced.

It is still another object of our invention to provide a new and improved phonograph pickup construction in which a pair of complementary molded members, which enclose the electrical current producing elements of a phonograph pickup, are held in assembled relation by means of a replaceable stylus assembly.

It is a still further object of our invention to provide a new and improved phonograph pickup of the variable reluctance type which utilizes a replaceable stylus assembly which is constructed to assure proper orientation of the stylus with respect to the other operative elements of the pickup.

One of the features of our improved phonograph pickup construction is the use of two interfitting molded parts which enclose the electric current producing portions of a phonograph pickup. The parts are held in assembled relation by means of a replaceable stylus assembly. The pickup is of the variable reluctance type and the stylus assembly includes a member positioned to assure proper orientation of a stylus and a magnetic stylus-carrying member with respect to pole pieces in the magnetic circuit of the pickup.

Figure 2:
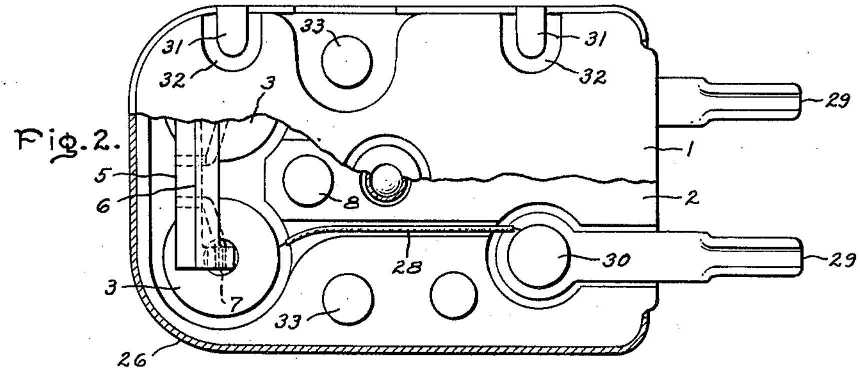
Figure 3:
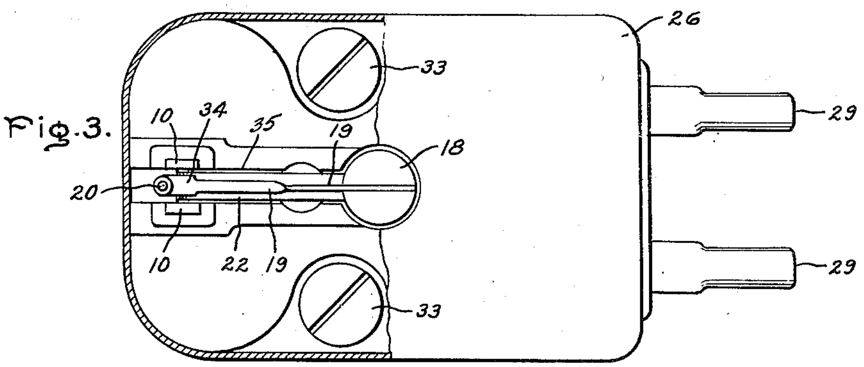
Figure 4:
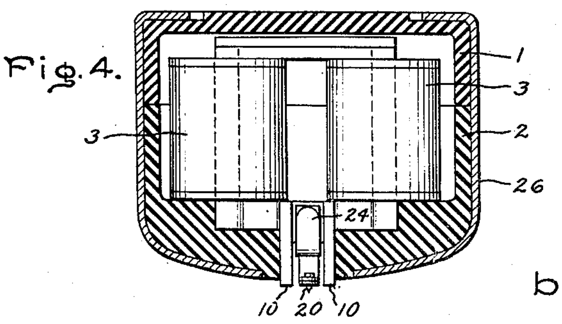

The novel features which we believe to be characteristic of our invention are set forth with particularity in the appended claims. Our invention itself, however, both as to its organization and method of operation, together with further objects and advantages thereof, may best be understood by reference to the following description taken in conjunction with the accompanying drawing in which Fig. 1 is a sectional side elevational view of a phonograph pickup embodying our invention; Fig. 2 is a top plan view, partly in section, of the pickup shown in Fig. 1; Fig. 3 is a bottom plan view, partly in section, of the pickup of Fig. 1; and Fig. 4 is an end view of the pickup taken along the line 4—4 of Fig. 1.

Referring to Fig. 1 of the drawing, we have illustrated our improved pickup as comprising a pair of interfitting molded members 1, 2 formed of any suitable plastic material, opposite portions of which contain recesses to enclose the operative elements of the pickup. Thus, a pair of coils 3 are supported in a recess 4 in the base 2 and extend into a complementary recess in the cover member 1. The respective coils 3 surround different legs of a pair of ferromagnetic yoke members 5, 6 and a plurality of magnetic laminations 7 positioned between the yoke members 5, 6. The magnetic flux which traverses the coils 3 is provided by means of a permanent magnet 8 preferably formed of a suitable aluminum-nickel-cobalt alloy and is supported in a hole 9 formed in the molded base member 2. The yokes 5, 6 and laminations 7 likewise are supported by placing the lower ends of these members into suitable recesses provided in the base member 2. A pair of pole pieces 10 associated with respective ones of the coils 3 are cemented into suitable apertures provided in the base member 2.

In accordance with our invention, the interfitting molded members 1, 2 are held in assembled relation by a stylus assembly which engages a tubular eyelet 11 attached to the cover member 1 by passing the eyelet through an aperture 12 in the cover 1 and flaring over the upper end 13 of the eyelet. A shoulder 14 spaced from the upper end of the eyelet 11 permits rigid attachment of the eyelet to the molded cover member 1. The lower portion of the eyelet 11 extends into a vertical opening, or receptacle, 15 provided in molded base member 2. Near its lower end eyelet 11 is provided with a circular indentation 16 adapted to receive and firmly hold a post, or shaft, 17 of the stylus assembly. The lower part of the post 17 is provided with an enlarged head 18 which engages the lower surface of base member 2 in the vicinity of aperture 15. Thus, when the post 17 is fully inserted into the eyelet, journal, or bearing 11, it is held firmly by indentation 16 and clamps the members 1, 2 in assembled relation. The eyelet 11, post 17 and head 18 form no part of the magnetic circuit of the pickup, but instead are constructed of a suitable non-magnetic material, such as brass.

The post 17 also provides means for supporting a twisted cantilever arm 19. The arm 19 is in the form of a twisted ribbon of suitable resilient magnetic material, such as, for example, tool steel, and is rigidly secured at one end by soldering to a slot provided in the head 18 attached to the post 17. At its other end, the arm 19 is provided with a stylus 20. Preferably, the stylus 20 is of the semi-permanent type and may comprise, for example, a jewel such as a sapphire. The stylus 20 is mounted in a boss or collar 21 and the end of the arm 19 bearing stylus 20 is positioned between pole pieces 10 so that, as the stylus is vibrated upon engagement with a groove of a sound record to be reproduced, the vibrations of the stylus produce corresponding changes in the flux passing through pole pieces 10 and the yoke 5, 6 and laminations 7 associated with the coils 3.

We also provide means for orienting the stylus 20 and its magnetic cantilever arm 19 to assure that, when the stylus assembly comprising post 17 and cantilever arm 19 is replaced, the end of the cantilever arm bearing stylus 20 is positioned substantially midway between pole pieces 10. This means comprises a guide 22 comprising a rectangular strip of suitable non-magnetic material, such as phosphor bronze, spaced from and arranged parallel with cantilever arm 19. At one end, guide 22 is provided with an enlarged apertured circular portion 23 which is adapted to slip over post 17 and may be secured to the upper surface of head 18, as by soldering. At its other end, the guide 22 has a vertically extending portion 24 which extends between pole pieces 10 and is of a width substantially equal to the distance between these pole pieces. Guide 22 forms no part of the magnetic circuit of the pickup, but instead is composed of a non-magnetic material so that it diverts none of the flux which passes between magnet 8 and pole pieces 10 via the ferromagnetic cantilever arm 19. A small block 25 of cellulose nitrate plastic or similar material positioned between guide 22 and the cantilever arm 19 at a point just forward of the twist between the ends of the cantilever arm provides sufficient damping to restrain the second mode of vibration of cantilever arm 19.

The pickup comprising the interfitting members 1, 2, is enclosed by means of a ferromagnetic metallic shield or case 26. The bottom wall of case 26, as well as the bottom portion of base member 2, are not parallel with the upper surface of cover member 1, but are inclined at a slight angle thereto. Thus, the height of the pickup at the left-hand end adjacent stylus 20 is greater than the height at the right-hand end. These dimensions are made different so that, when the pickup is used in an automatic record changer of the type which plays successively different ones of a stack of records, when the last record is being played the pickup does not ride on the surface of the last record. Instead, only the stylus, which is at the lowest point of the pickup, rides upon the record and engages the grooves or sound track therein. For the same reason, cantilever arm 19 is inclined at a slight angle to the horizontal position. This is illustrated by the position of the dotted line representing the right-hand portion of cantilever arm 19 relative to head 18. Near its left-hand end, that is, the end bearing stylus 20, cantilever arm 19 is provided with a portion 27 which extends in a horizontal direction. Thus, the portion 27 lies in a horizontal plane and is inclined at a slight angle relative to the remainder of the cantilever arm 19. As a result, when a tone arm bearing our improved pickup is playing the last record in a stack of records, the portion 27 of the cantilever arm is substantially parallel to the surface of the record. The remainder of the cantilever and the base of the pickup axis are inclined upwardly at a slight angle to the surface of such last record, thus assuring that no portion of the pickup other than the stylus itself engages the upper surface of such last record.

Fig. 2 is a top plan view of the pickup which illustrates the relative positions of coils 3, yokes 5, 6, laminations 7, and permanent magnet 8. Coils 3 are connected in series relation and are electrically connected by means of a pair of conductors 28 to output terminals 29. Terminals 29 are secured to base member 2 by means of rivets 30. The metallic case 26 is attached to the pickup assembly by means of a plurality of ears 31 which are bent over and fit into recesses 32 provided in the upper surface of cover 1. In order that the pickup may be attached to the pickup arm of a record player, we provide a pair of screws 33 which extend through aligned apertures in members 1, 2.

Fig. 3 is a bottom plan view of the pickup and illustrates the relative positions of pole pieces 10, guide 22, cantilever arm 19, and stylus 20. This figure, moreover, illustrates more clearly the construction of the cantilever 19. At its left-hand end, this cantilever is provided with an enlarged portion 34, or armature, to which the stylus 20 is attached, and below which the stylus engages the record to be played. The enlarged portion 34, however, is narrower in width than the guide 22, thus assuring that, when one stylus assembly is replaced by a new one, the stylus of the new assembly will be located substantially midway between pole pieces 10. Thus, the stylus may be changed easily and quickly by a relatively inexperienced person simply by inserting a suitable punch, such as the end of a paper clip, into eyelet 11 to engage the upper end of rod 17 and forcing the entire stylus assembly out of the eyelet. In assembling a new stylus assembly, pressure of one's fingers is sufficient to cause the rod or part 17 of the new assembly to be held securely by indentation 16. At the same time, guide 22 automatically orients cantilever arm 19 so that the stylus is positioned substantially midway between pole pieces 10.

Fig. 4 is a front view of the stylus and illustrates the position of the vertically extending portion 24 of guide 22 relative to pole pieces 10. This figure, moreover, illustrates the relative positions of the overlying recesses in members 1, 2 in which are located all the electric current generating portions of the pickup including the coils 3 and the associated magnetic structure.

In the operation of the reluctance type pickup described, the portion 34 of cantilever arm 19 is centered in the air gap between the pole pieces 10 and, when the stylus 20 is vibrated upon engagement with the groove of a sound record, the vibrations of the stylus produce corresponding changes in the flux passing through the portions of the yokes and laminations 5—7 within the two coils 3. When the stylus is in its mid position, as shown in Figs. 3 and 4, substantially the same amount of flux passes through both cores. However, as soon as the stylus is displaced toward one of the cores, a greater amount of flux flows in that core than in the other, there being an increase of flux in the one core and a decrease in the other. It will thus be seen that the change of flux through the two cores is in opposite directions, one increasing and one decreasing. When the stylus is loaded within a predetermined range, for example, with an unbalanced load on the stylus of the order of one-half ounce, the characteristics of the pickup are linear and the stylus follows the sound track accurately. Should the loading become excessive for any reason, as for example if the pickup is hit or dropped, the stylus 20 will recede within the centrally positioned aperture 35 in the molded base member 2. The tips of pole pieces 10 then engage the surface of the record to prevent further stressing of the cantilever arm. The stylus is thus prevented from damage and from overloading.

While we have described a particular embodiment of our invention, other applications and arrangements will readily occur to those skilled in the art. We do not, therefore, desire our invention to be limited to the specific construction illustrated and described and we intend by the accompanying claims to cover all modifications within the spirit and scope of our invention.

What we claim as new and desire to secure by Letters Patent of the United States is:

1. A phonograph pickup comprising a supporting member, a permanent magnet, means for securing said magnet to said member, a core structure, means for securing said core structure to said member in spaced relation to said magnet, means including said core structure and said magnet for forming a magnetic path having an air gap therein, a cantilever beam of magnetic material included in said path, a stylus, said beam including means for supporting said stylus at one end thereof, means for positioning said stylus substantially within said gap, means for rigidly supporting the other end of said beam and means for removably attaching and retaining, said supporting means in engagement with said supporting member.

2. An electric translating device comprising a supporting member, a permanent magnet, means for securing said magnet to said member, a core structure, means for securing said core structure to said member in spaced relation to said magnet, means including said core structure and said magnet for forming a magnetic path having an air gap therein, a post, means for removably attaching said post to said supporting member at a position outside of said path, a ferromagnetic cantilever beam, means for rigidly attaching one end of said beam to said post, said cantilever beam extending between said magnet and said gap and forming a portion of said path, a stylus, said beam including means for supporting said stylus entirely by said beam at the other end thereof and means for positioning said stylus substantially in said gap, said positioning means being supported by said post for aligning the position of said stylus relative to said gap.

3. An electric translating device comprising a supporting member, a permanent magnet, means for securing said magnet to said member, a core structure, means for securing said core structure to said member in spaced relation to said magnet, means including said core structure and said magnet for forming a magnetic path having an air gap therein, a post, means for removably attaching said post to said supporting member at a position outside of said path, a ferromagnetic cantilever beam, means for rigidly attaching one end of said beam to said post, said cantilever beam extending between said magnet and said gap and forming a portion of said path, a stylus, said beam including means for supporting said stylus entirely by said beam at the other end thereof and means for positioning said stylus substantially in said gap, said positioning means comprising a non-magnetic member supported by said post and extending into said gap for orienting said stylus relative to said gap.

4. A phonograph pickup comprising a supporting member, a permanent magnet, means for supporting said magnet from said member, a core structure, means for supporting said core structure from said member in spaced relation to said magnet, means including said core structure and said magnet for forming a magnetic path having an air gap therein, a cantilever beam of magnetic material included in said path, a stylus, said beam including means for supporting said stylus at one end thereof, means for positioning said stylus substantially within said gap, a receptacle, means for positioning said receptacle on said supporting member at a point outside said path, a mounting post, and means for rigidly supporting the other end of said beam from said post, said post being constructed and arranged to plug into said receptacle, whereby said stylus may be readily inserted into and removed from said air gap.

5. An electric translating device comprising a supporting member, a permanent magnet, means for supporting said magnet from said member, a core structure, means for supporting said core structure from said member in spaced relation to said magnet, means including said core structure and said magnet for forming a magnetic path having an air gap therein, a receptacle, means for positioning said receptacle on said supporting member at a point outside said path, and a unitary stylus subassembly comprising a supporting post constructed and arranged to be plugged into said receptacle, a ferromagnetic cantilever beam, means for rigidly attaching one end of said beam to said post, said cantilever beam extending between said magnet and said gap and forming a portion of said magnetic path, and a stylus, said beam including means for supporting said stylus entirely by said beam at the other end thereof within said air gap.

6. An electric translating device comprising a supporting member, a permanent magnet, means for securing said magnet to said member, a core structure, means for securing said cores structure to said member in spaced relation to said magnet, means including said core structure and said magnet for forming a magnetic path having an air gap therein, a receptacle, means for securing said receptacle to said supporting member at a point outside of said path, and a unitary stylus subassembly comprising a supporting post constructed and arranged to be plugged into said receptacle, a ferromagnetic cantilever beam, means for rigidly attaching one end of same beam to said post, said cantilever beam being arranged to extend between said magnet and said gap and to form a portion of said magnetic path, a stylus, said beam including means for supporting said stylus entirely by said beam at the other end thereof, and means comprising an elongated member supported by said post for aligning the position of said stylus relative to said air gap.

7. An electric translating device comprising a supporting member, a permanent magnet, means for supporting said magnet from said member, a core structure, means for supporting said core structure from said member in spaced relation to said magnet, said core structure and said magnet forming a magnetic path having an air gap therein, a receptacle, means for positioning said receptacle on said supporting member at a point outside of said path, and a unitary stylus subassembly comprising a supporting post constructed and arranged to be plugged into said receptacle, a ferromagnetic cantilever beam, means for rigidly attaching one end of said beam to said post, said cantilever beam being arranged to extend between said magnet and said gap and to form a portion of said magnetic path, a stylus, said beam including means for supporting said stylus entirely by said beam at the other end thereof, a rigid non-magnetic member, and means for maintaining said non-magnetic member in spaced parallel relation to said cantilever beam, said non-magnetic member having one end thereof supported by said post, the free other end of said non-magnetic member being constructed and arranged closely to fit within said air gap, thereby to orient said stylus relative to said air gap.

8. An electric translating device comprising a supporting member, a permanent magnet, means for supporting said magnet from said member, a core structure, means for supporting said core structure from said member in spaced relation to said magnet, said core structure and said magnet forming a magnetic path having an air gap therein, a receptacle, means for positioning said receptacle on said supporting member at a point outside of said path, a unitary stylus subassembly comprising a supporting post constructed and arranged to be plugged into said receptacle, a ferromagnetic cantilever beam, means for rigidly attaching one end of said beam to said post, said cantilever beam being arranged to extend between said magnet and said gap and to form a portion of said magnetic path, a stylus, said beam including means for supporting said stylus entirely by said beam at the other end thereof, a rigid non-magnetic member, means for maintaining said non-magnetic member in spaced parallel relation to said cantilever beam, said non-magnetic member having one end thereof supported by said post, the free other end of said non-magnetic member being constructed and arranged closely to fit within said air gap, thereby to orient said stylus relative to said air gap, damping means, and means for positioning said damping means between said non-magnetic member and said cantilever beam, thereby to restrain undesired vibrations of said beam.

9. An electric translating device comprising a supporting member, a permanent magnet, means for supporting said magnet from said member, a core structure, means for supporting said core structure from said member in spaced relation to said magnet, said core structure and said magnet forming a magnetic path having an air gap therein, a receptacle, means for positioning said receptacle on said supporting member at a point outside of said path, and a unitary stylus subassembly comprising a supporting post constructed and arranged to be plugged into said receptacle, a ferromagnetic cantilever beam, means for rigidly attaching one end of said beam to said post, said cantilever beam being arranged to extend between said magnet and said gap and to form a portion of said magnetic path, a stylus, said beam including means for supporting said stylus entirely by said beam at the other end thereof within said air gap, and means providing access to said receptacle from the top of said supporting member, whereby said stylus assembly may be quickly detached by forcing said post from within said receptacle.

10. A unitary plug-in stylus assembly for a phonograph pickup comprising a vertically disposed supporting post, an elongated flexible cantilever arm of magnetic material, means for securing one end of said arm to said post and for positioning said arm with its principal axis extending substantially horizontally, a stylus, means at the free other end of said arm for entirely supporting said stylus, said stylus being and arranged to be vibrated by the sound track of a record, an armature, means for positioning said armature above said stylus at the free end of said arm, said armature being arranged for cooperation with the stationary pole pieces of the pickup, said flexible arm having sufficient compliance substantially to prevent transmission of the vibrations of said armature to said supporting post, a stylus orienting member, and means for supporting said orienting member from said post.

11. A unitary plug-in stylus assembly for a phonograph pickup comprising a vertically disposed supporting post, an elongated flexible cantilever arm of magnetic material, means for securing one end of said arm to said post and for positioning said arm with its principal axis extending substantially horizontally, a stylus, means at the free other end of said arm for entirely supporting said stylus, said stylus being arranged to be vibrated by the sound track of a record, an armature, means for positioning said armature above said stylus at the free end of said arm, said armature being arranged for cooperation with the stationary pole pieces of the pickup, said flexible arm having sufficient compliance substantially to prevent transmission of the vibrations of said armature to said supporting post, stylus orienting means, means for supporting said orienting means from said post, said orienting means comprising a rigid non-magnetic member spaced from and arranged substantially parallel with said arm, damping means, and means for positioning said damping means between said rigid member and said arm.

12. A unitary plug-in stylus assembly for a phonograph pickup comprising a vertically disposed supporting post, an elongated flexible cantilever arm of magnetic material, means for securing one end of said arm to said post and for positioning said arm with its principal axis extending substantially horizontally, a stylus, means at the free other end of said arm for entirely supporting said stylus, said stylus being arranged to be vibrated by the sound track of a record, an armature, means for positioning said armature above said stylus at the free end of said arm, said armature being arranged for cooperation with the stationary pole pieces of the pickup, said flexible arm having sufficient compliance substantially to prevent transmission of the vibrations of said armature to said supporting post, stylus orienting means, means for supporting said orienting means from said post said orienting means comprising a rigid non-magnetic member spaced from and arranged substantially parallel with said arm, damping means, means for positioning said damping means between said rigid member and said arm, the free end of said non-magnetic member being of greater width than said armature to protect said armature and stylus during the insertion into and removal from the pickup of said stylus assembly.

13. The combination, in a phonograph pickup of the reluctance type, of a carrier member having a magnet supported therein, a core structure including means for forming an air gap, and an attachment means, means for maintaining said magnet air gap and attachment means in alignment, a removable stylus assembly comprising a cantilever beam having at one end a second attachment means, said second attachment means being arranged to cooperate with said first attachment means, a stylus, means securing said stylus to the other end of said beam, said beam extending from said air gap past said magnet to said attachment means and being composed of magnetic material to carry flux from said magnet through said air gap to said core structure, and a coil on said core structure arranged to have electromotive force induced therein in response to vibrations of said stylus and lever, said first and second attachment means comprising cooperating members arranged for disengagement in response to disengaging force readily applied by the hand.

14. The combination, in a phonograph pickup, of a core structure having a horizontal air gap substantially parallel to the surface of the record to be played and a magnet spaced therefrom, a cantilever beam of magnetic material, a supporting means, means securing one end of said beam to said supporting means, said beam being arranged to extend from said air gap past said magnet, a stylus, means for securing said stylus to said beam near said air gap, whereby horizontal vibrations produced by cooperation of the stylus with a record cause flux variations in said core structure, said supporting means comprising a pair of cooperating members one fixed to said magnet and core structure and the other fixed to said cantilever beam, said cooperating members having friction engagement means to permit said cantilever beam, said stylus and said one member all to be readily detached from said pickup when replacement of said stylus is required.

15. A phonograph pickup stylus assembly comprising an attachment means for detachably securing said assembly to a pickup head, two cantilever beams, means for affixing one end of each of said beams to said attachment means so as to project radially therefrom, a stylus, means for affixing said stylus to one of said beams near its other end, and means comprising the other of said beams for providing an indexing means spaced from said attachment means, said indexing means being arranged for engagement with a cooperating indexing means located on said head.

16. A quick-replaceable stylus subassembly for use in a phonograph pickup head having a socket member therein, comprising in combination, a pin constructed and arranged to be inserted axially into said member, a cantilever arm, means for securing one end of said arm to said pin, said arm having a free end radially disposed with respect to the axis of said pin, a stylus, means for mounting said stylus on said arm near its free end, a second cantilever arm, means for securing one end of said second arm to said pin, said second arm also having a free end radially disposed with respect to the axis of said pin, an indexing means, and means for supporting said indexing means on said second arm near its free end, said indexing means being arranged to engage said pickup head to prevent rotation of said subassembly when said pin is inserted into said first socket member and when said arms are in predetermined angular positions.

17. A quick-replaceable stylus subassembly for use in phonograph pickup head provided with a socket member, said head being of the variable reluctance type including a pair of spaced pole pieces, comprising in combination, a pin constructed and arranged to be retained in said socket member when inserted axially therein, a cantilever arm of magnetic material, means for affixing said arm at one end to said pin, said arm lying in a transverse plane intersecting the axis of the pin, said arm forming a portion of the magnetic circuit of said head when its free end is positioned between said pole pieces, a stylus, means for mounting said stylus on said arm near its free end, a strip of non-magnetic material, means for affixing said strip at one end to said pin so as to extend from said pin in a second transverse plane, said strip having an end portion at its free end arranged for close engagement with a slot in said head when said pin is inserted into said socket member and when said arm is aligned so that its free end lies between said pole pieces.

18. A removable stylus subassembly for use in a phonograph pickup head having a transverse journal member therein, comprising a supporting shaft adapted to be inserted axially into said member, a cantilever stylus arm, said arm having one end affixed to an end of said shaft so that said arm projects substantially radially from said shaft, a cantilever indexing arm, said indexing arm having one end also affixed to said shaft near said end so that said indexing arm is spaced from and substantially parallel to said stylus arm, a phonograph stylus, and means for mounting said stylus on said stylus arm near is free end.

19. A removable stylus subassembly for use in a phonograph pickup head having a transverse journal member therein, comprising a supporting shaft adapted to be inserted axially into said member, a cantilever stylus arm, said arm having one end rigidly attached to an end of said shaft so that said arm projects substantially radially from said shaft, a cantilever indexing arm, said indexing arm having one end also rigidly attached to said shaft near said end so that said indexing arm is spaced from and substantially parallel to said stylus arm, a phonograph stylus, means for mounting said stylus on said stylus arm near its free end, a damping block of resilient material arranged to be fitted between said arms in contact with both arms, and means for securing said block to at least one of said arms.

20. A removable stylus subassembly for use in a phonograph pickup head having a transverse bearing member therein, said subassembly comprising a supporting shaft adapted to be received axially and supported by said bearing member, a cantilever stylus arm, said arm being affixed to said supporting shaft and projecting substantially radially from said supporting shaft, an indexing arm also affixed to said supporting shaft and projecting substantially radially therefrom in parallel spaced relation to said cantilever stylus arm and adapted to cooperate with said pickup head to position said stylus arm as said support is inserted into said bearing member, and a stylus affixed to said stylus arm for cooperation with a phonograph record.

21. A removable stylus subassembly for use in a magnetic pickup head having a transverse bearing member and a pair of pole pieces, said subassembly comprising a supporting member adapted to be received axially and supported by said bearing member, a resilient magnetic cantilever stylus arm and a guide member each affixed to said supporting member and each projecting substantially radially therefrom, in parallel spaced relation with each other, said guide member being adapted to cooperate with said pickup head to position said stylus arm between said pole pieces when said support is inserted in said bearing member, and a stylus affixed to said resilient magnetic stylus arm for cooperation with a phonograph record.

22. A removable stylus subassembly for use in a phonograph pickup head having a transverse bearing member therein, said subassembly comprising a supporting shaft adapted to be inserted into said bearing member, a resilient cantilever stylus arm, said arm being affixed to an end of said shaft and projecting substantially radially therefrom, a cantilever indexing arm affixed to said shaft near said end and projecting therefrom substantially parallel to said resilient stylus arm, a stylus carried by said stylus arm, and a damping block between and in contact with both of said arms.

23. A removable stylus subassembly for use in a phonograph pickup head having a transverse bearing member and a pair of pole pieces spaced therefrom, said subassembly comprising a supporting shaft adapted to be received and supported in said bearing member, a cantilever stylus arm and a guide arm each affixed at one end of said support and projecting in the same radial direction but in different planes therefrom, said guide arm being wider than said stylus arm and adapted to cooperate with said pickup head to guide said stylus arm between said pole pieces as said supporting shaft is received in said bearing member, said stylus arm having a stylus mounted thereon for cooperation with a phonograph record.

ERIC O. PETERSON.
CARROLL R. MINER.

REFERENCES CITED

The following references are of record in the file of this patent:

UNITED STATES PATENTS

| Number | Name | Date |
|---|---|---|
| 1,835,073 | McClatchie | Dec. 8, 1931 |
| 1,944,258 | Mitchell | Jan. 23, 1934 |
| 2,110,092 | Norton | Mar. 1, 1938 |
| 2,224,332 | Alsbrook | Dec. 10, 1940 |
| 2,271,899 | Miller | Feb. 3, 1942 |
| 2,320,416 | Dally | June 1, 1943 |
| 2,325,343 | Semple | July 27, 1943 |
| 2,363,497 | Begun | Nov. 28, 1944 |
| 2,494,438 | Gilbert | Jan. 10, 1950 |